(12) United States Patent
Koker et al.

(10) Patent No.: US 12,451,234 B2
(45) Date of Patent: Oct. 21, 2025

(54) ACTIONABLE VISUALIZATION BY OVERLAYING HISTORICAL DATA ON A REAL-TIME IMAGE ACQUISITION WORKFLOW OVERVIEW

(71) Applicant: KONINKLIJKE PHILIPS N.V., Eindhoven (NL)

(72) Inventors: Ekin Koker, Cambridge, MA (US); Ranjith Naveen Tellis, Tewksbury, MA (US); Siva Chaitanya Chaduvula, Malden, MA (US); Xiuye Chen, Cambridge, MA (US); Olga Starobinets, Newton, MA (US); Sandepp Madhukar Dalal, Winchester, MA (US); Yuechen Qian, Lexington, MA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 324 days.

(21) Appl. No.: 18/265,990

(22) PCT Filed: Dec. 9, 2021

(86) PCT No.: PCT/EP2021/084910
§ 371 (c)(1),
(2) Date: Jun. 8, 2023

(87) PCT Pub. No.: WO2022/122873
PCT Pub. Date: Jun. 16, 2022

(65) Prior Publication Data
US 2024/0038364 A1 Feb. 1, 2024

Related U.S. Application Data

(60) Provisional application No. 63/124,107, filed on Dec. 11, 2020.

(51) Int. Cl.
*G16H 30/20* (2018.01)
*G06F 3/04817* (2022.01)
(Continued)

(52) U.S. Cl.
CPC ......... *G16H 30/20* (2018.01); *G06F 3/04817* (2013.01); *G06V 10/44* (2022.01); *G16H 30/40* (2018.01); *G16H 80/00* (2018.01)

(58) Field of Classification Search
CPC ........ G16H 30/20; G16H 30/40; G16H 80/00; G06V 10/44; G06F 3/04817
(Continued)

(56) References Cited

U.S. PATENT DOCUMENTS 9,047,661 B2  6/2015  Oda
11,213,220 B2 * 1/2022  Schieke ................. G16H 10/20
(Continued)

OTHER PUBLICATIONS

International Search Report and Written Opinion Dated Apr. 7, 2022 for International Application No. PCT/EP2021/084910 Filed Dec. 9, 2021.

*Primary Examiner* — William D Titcomb

(57) ABSTRACT

A method (100) of providing remote monitoring of a local operator (LO) of a medical imaging device (2) during a medical imaging examination, the method including: mapping image features to medical imaging examinations based at least on timestamps of the image features, the medical imaging examinations to which the image features are mapped including completed medical imaging examinations and a current medical imaging examination; converting the image features mapped to each completed medical imaging examination into a representation (43) of the completed medical imaging examination and a representation (47) of a current status of the current medical imaging examination; generating at least one completion time statistic (45) representing the completion times for the completed medical
(Continued)

imaging examinations; and during the current medical imaging examination, displaying the representation of the current status of the current medical imaging examination and the at least one completion time statistic on the workstation.

20 Claims, 8 Drawing Sheets

(51) Int. Cl.
*G06V 10/44* (2022.01)
*G16H 30/40* (2018.01)
*G16H 80/00* (2018.01)

(58) Field of Classification Search
USPC .......................................................... 382/128
See application file for complete search history.

(56) References Cited

U.S. PATENT DOCUMENTS

| | | | |
|---|---|---|---|
| 12,276,763 B2* | 4/2025 | Munier | G01T 1/2985 |
| 2009/0089092 A1 | 4/2009 | Johnson | |
| 2019/0156484 A1 | 5/2019 | Nye | |
| 2019/0261938 A1 | 8/2019 | Sevenster | |
| 2020/0111047 A1 | 4/2020 | Johnson | |
| 2020/0160574 A1 | 5/2020 | Nye | |
| 2022/0005565 A1* | 1/2022 | Lyman | G16H 15/00 |
| 2022/0076410 A1* | 3/2022 | Georgescu | G06F 18/24 |
| 2022/0253592 A1* | 8/2022 | Rao | G16H 30/20 |
| 2022/0301686 A1* | 9/2022 | Rohse | G16H 30/20 |
| 2024/0038364 A1* | 2/2024 | Koker | G16H 30/40 |
| 2024/0185100 A1* | 6/2024 | Ihsani | G16H 30/40 |
| 2024/0233921 A1* | 7/2024 | Do | G16H 80/00 |

* cited by examiner

ACTIONABLE VISUALIZATION BY OVERLAYING HISTORICAL DATA ON A REAL-TIME IMAGE ACQUISITION WORKFLOW OVERVIEW

CROSS REFERENCE TO RELATED APPLICATIONS

This application is the U.S. National Phase application under 35 U.S.C. § 371 of International Application No. PCT/EP2021/084910 filed Dec. 9, 2021, which claims the benefit of U.S. Provisional Patent Application No. 63/124,107 filed Dec. 11, 2020. These applications are hereby incorporated by reference herein.

The following relates generally to the imaging arts, remote imaging assistance arts, remote imaging examination monitoring arts, imaging data analytics arts, and related arts.

BACKGROUND

The demand for high quality medical imaging by techniques such as magnetic resonance imaging (MRI), transmission computed tomography (CT), positron emission tomography (PET), and other medical imaging modalities is high, and is expected to increase with an aging population in many countries and other factors such as improved imaging system capabilities and improved techniques for generating actionable clinical findings from medical images. The increasing problem of getting highly qualified staff (sometimes referred to as imaging technicians or technologists) for performing complex medical imaging examinations has driven the concept of bundling medical expertise in remote service centers. The basic idea is to provide virtual availability of Senior Technologists as on-call experts in case a (local, on-site) technologist or operator performing a medical imaging examination needs assistance with a scheduled examination or runs into unexpected difficulties. In either case, the remote expert would remotely assist the on-site operator by receiving real-time views of the situation by way of screen mirroring of the display of the medical imaging device controller and optionally other information feeds such as one or more video feeds of the imaging bay. The remote expert typically would not directly operate the medical imaging device, but would provide advice or other input for assisting the local technologist by way of telephonic or videoconferencing communication.

To make such a remote service center commercially viable, it would be advantageous to enable the remote expert to concurrently assist (or be on call to assist) a number of different local technologists performing possibly concurrent medical imaging examinations. The local technologists may be located in a single hospital, or may be distributed among several hospitals in the same geographic area (e.g. a single city) or across a larger geographical area (e.g., spread across several states or even different countries). Preferably, the remote service center would be able to connect the expert to imaging systems of different models and/or manufactured by different vendors, since many hospitals maintain a heterogeneous fleet of imaging systems. This can be achieved by screen sharing or screen mirroring technologies that provide the remote expert a real-time copy of the imaging device controller display, optionally along with video cameras to provide views of the imaging bay and, optionally, the interior of the bore or other examination region of the imaging device. Such scalability can enable many local operators to benefit from the assistance of a single highly qualified remote expert (or small group of highly qualified remote experts) in a cost-effective manner.

The remote expert is assumed to have experience and expertise with the different user interfaces of the different medical imaging systems and vendors for which the expert is qualified to provide assistance. When providing (potentially simultaneous) assistance to multiple imaging bays, the expert is expected to rapidly switch between the screen views of the different imaging systems to extract the required pieces of information for quickly assessing the situation in each imaging bay. This is challenging as required pieces of information may be differently located on differently designed user interfaces, and some information that would be useful to the remote expert may not be shown at all on the current display. For example, if the local operator has re-run a given imaging acquisition stage multiple times, this may not be apparent simply from observing the current imaging device controller display, and so the remote expert may be unaware that the local operator is having difficulty. In such a situation, the local operator would preferably contact the remote expert for assistance, but the local operator may be reluctant to do so due to embarrassment, a desire to solve the problem independently, or the like.

The following discloses certain improvements to overcome these problems and others.

SUMMARY

In one aspect, a non-transitory computer readable medium stores instructions executable by at least one electronic processor to perform a method of providing remote monitoring of a local operator of a medical imaging device during a medical imaging examination. The method including: extracting image features from image frames displayed on a display device of a controller of the medical imaging device during medical imaging examinations performed using the medical imaging device; mapping the image features to medical imaging examinations based at least on timestamps of the image features, the medical imaging examinations to which the image features are mapped including completed medical imaging examinations and a current medical imaging examination; converting the image features mapped to each completed medical imaging examination into a representation of the completed medical imaging examination, wherein the representation of the completed medical imaging examination includes at least one completion time for the completed medical imaging examination; generating at least one completion time statistic representing the completion times for the completed medical imaging examinations or a subset of the completed medical imaging examinations; converting the image features mapped to the current medical imaging examination into a representation of a current status of the current medical imaging examination including at least an elapsed time of the current medical imaging examination; during the current medical imaging examination, displaying the representation of the current status of the current medical imaging examination on a workstation that is separate from the medical imaging device; and while displaying the representation of the current status of the current medical imaging examination on the workstation, additionally displaying a representation of the at least one completion time statistic on the workstation.

In another aspect, an apparatus for providing assistance from a remote expert to a local operator during a medical imaging examination performed using a medical imaging device includes a workstation operable by the remote expert.

At least one electronic processor is programmed to: extract image features from image frames displayed on a display device of a controller of the medical imaging device during medical imaging examinations performed using the medical imaging device; map the image features to medical imaging examinations based at least on timestamps of the image features, the medical imaging examinations to which the image features are mapped including completed medical imaging examinations and a current medical imaging examination; convert the image features mapped to each completed medical imaging examination into a representation of the completed medical imaging examination, wherein the representation of the completed medical imaging examination includes at least one completion time for the completed medical imaging examination; generate at least one completion time statistic representing the completion times for the completed medical imaging examinations or a subset of the completed medical imaging examinations; converting the image features mapped to the current medical imaging examination into a representation of a current status of the current medical imaging examination including at least an elapsed time of the current medical imaging examination; during the current medical imaging examination, display the representation of the current status of the current medical imaging examination on a workstation that is separate from the medical imaging device; while displaying the representation of the current status of the current medical imaging examination on the workstation, additionally display a representation of the at least one completion time statistic on the workstation; and display an icon selectable by the remote expert to establish a communication pathway between the remote expert and the local operator.

In another aspect, a method of providing assistance from a remote expert to a local operator during a plurality of medical imaging examinations includes: extracting image features from image frames displayed on a display device of a controller of a plurality of medical imaging devices performing the plurality of medical imaging examinations; converting the image features mapped to the current medical imaging examination into a corresponding number of representations of a current status of each current medical imaging examination; and displaying each representation of the current status of each current medical imaging examination on a workstation that is separate from the medical imaging device.

One advantage resides in providing a remote expert or radiologist assisting a technician in conducting a medical imaging examination with situational awareness of local imaging examination(s) which facilitates providing effective assistance to one or more local operators at different facilities.

Another advantage resides in providing a remote expert or radiologist assisting one or more technicians in conducting a medical imaging examination with a list or other summary of relevant extracted information from shared screens of different medical imaging systems operated by technicians being assisted by the remote expert or radiologist.

Another advantage resides in providing a remote expert with a visualization of context-specific historical imaging examination data to allow the remote expert to determine whether to intervene in a current imaging examination.

Another advantage resides in a remote expert being able to provide assistance to a local technologist during an imaging examination without input from the local technologist.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure.

DETAILED DESCRIPTION

Figure 1:
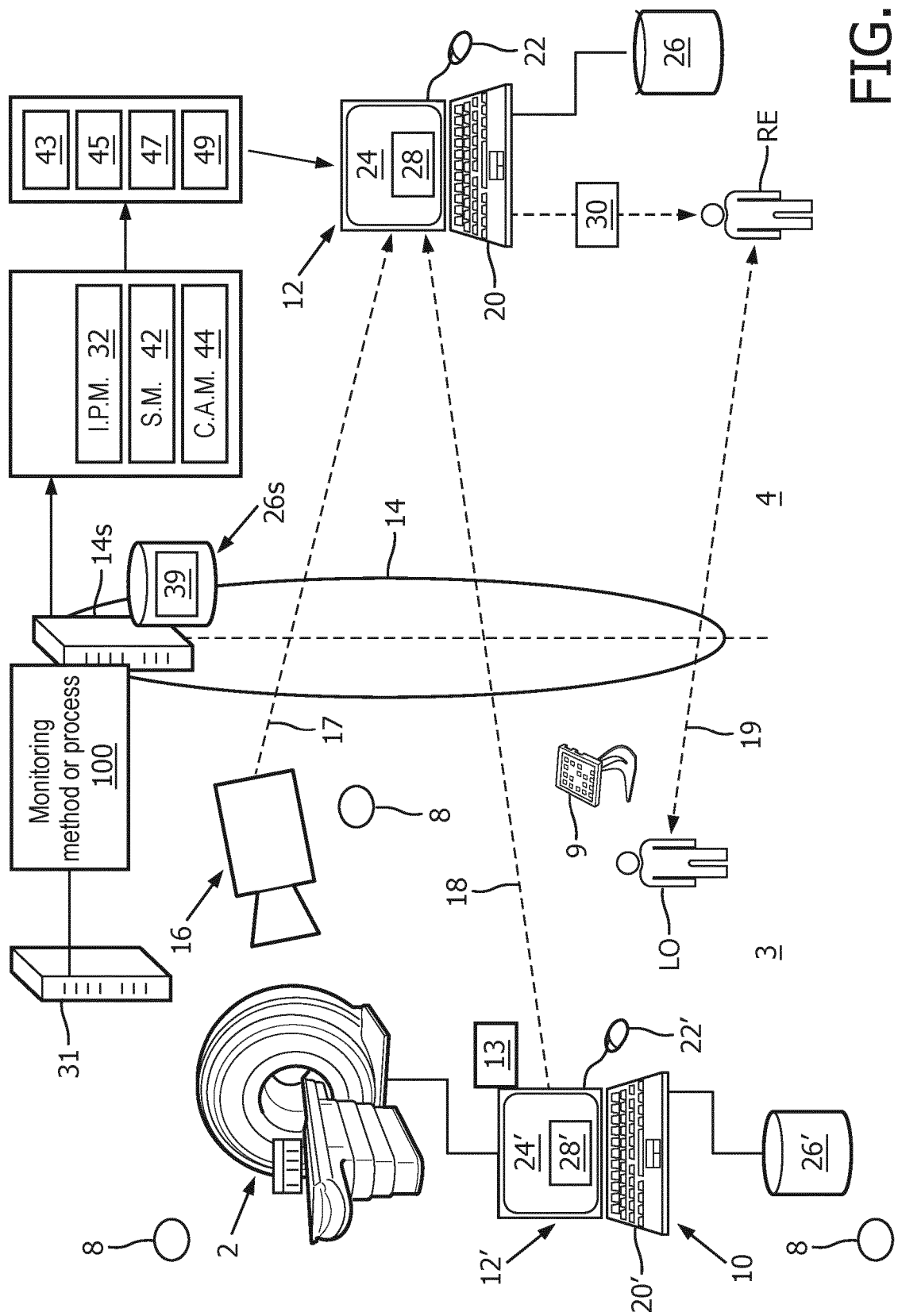
FIG. 1 diagrammatically shows an illustrative apparatus for providing remote assistance in accordance with the present disclosure.

The following relates to a remote assistance system for assisting local imaging technicians in performing medical imaging examinations. Such a remote assistance system is sometimes referred to as a Radiology Operations Command Center (ROCC), and provides remote "supertech" assistance to a local technician performing an imaging examination. The ROCC may for example provide vendor- and model-agnostic screen sharing of the imaging device console with the remote expert (i.e., the "supertech"), along with video-conferencing capability. Other information feeds to the remote expert may also be provided, such as a bay camera for providing the remote expert with a view of the imaging bay preferably capturing the patient loading/unloading area and/or other critical area(s).

The ROCC preferably provides vendor- and model-agnostic screen sharing of the imaging device console with the remote expert, along with videoconferencing capability. Typically, an ROCC session is created by manual initiation of the ROCC session by the local technician. However, as previously noted, this initiative by the local technician may be hindered by various factors that may cause the local technician experiencing a problem to delay or even fail to proactively initiate an ROCC session. Such a delay or failure can lead to numerous adverse results such as degraded image quality, late-running imaging examinations that adversely impact the patient and the laboratory examinations schedule, and/or in some instances even equipment damage or harm to the patient (for example, if a PET scan needs to be rescheduled because the radiopharmaceutical has decayed to the point where a new dose must be administered—beside requiring a new examination, this increases the total radiation dose to the patient).

This following provides a more automated arrangement in which the remote expert can take a more proactive role in initiating an ROCC session. In one aspect, the remote expert is provided with an overview screen, for example a grid of icons, with each icon providing status information on a single monitored imaging bay. The icons may provide sufficient information for the remote expert to make a determination that assistance is needed (possibly after clicking on the icon to bring up additional real-time information on the current imaging examination), at which point the remote expert can initiate a videoconference. Additionally or alternatively, the system can automatically detect situations in which assistance may be needed, and provide an alert. In particular, the icons provide a (preferably graphical) summary of the examination time of the current medical examination (or some smaller unit such as a current stage of the current medical imaging examination) with information on a statistically expected completion time superimposed. In this way, the remote expert can immediately see whether the current examination is running overlong. Because various factors can impact the "expected" examination (or examination stage) completion time, in various embodiments the statistically expected completion time may be derived automatically from data collected by the ROCC on completed medical imaging examinations at whole-ROCC system level or at some smaller granularity (e.g., at the hospital level, or even for the specific local operator).

To implement the approach, the following discloses continually monitoring the shared imaging device display (even when that display is not being presented to the remote expert). This continuous monitoring suitably leverages the screen sharing hardware already in place for use during an ROCC assistance session. In some embodiments disclosed herein, the ROCC includes graphical user interface (GUI) screen templates that are used to extract information from the shared display, such as technologist ID, scan type, imaging device information, and current status of the imaging exam (e.g. which sequence is presently being performed). This information is extracted in real-time for the current imaging examination, but in embodiments disclosed herein also is recorded and stored to provide historical data on examination duration, individual imaging sequence (or other imaging stage) durations, and so forth. The mined data can be variously statistically analyzed, e.g. by technician, hospital, or so forth, and useful statistics such as average examination time and standard deviation of same can be extracted. This can be done dynamically (at higher computational cost) or on a weekly or other basis (at lower computational cost) and tabulated for the various types of imaging examinations, the various technologists, hospitals, or other desired granularities.

During the current imaging examination, the state of the current examination is compared against the average and/or standard deviation. Various contemplated ways of displaying this information are described herein, such as a time bar plotting the current examination progress and overlaying the average exam time and optionally also a standard deviation bar. Optionally, the state of the current examination can be compared automatically against the statistics and, if the current examination is taking unduly long (based on some threshold determined from the average time and possibly the standard deviation) then an audible and/or visual alert may be presented to the remote expert.

In some embodiments, the display format and/or alert behavior is dynamically adapted to the preferences of the remote expert, using reinforcement learning.

In addition to collecting historical data from the shared screen, in some embodiments additional information may be collected and utilized. For example, if the ROCC has authorized access to certain hospital databases via the HL-7 network then this could be mined, for example to determine patient age, gender, chronic conditions, or so forth. Such patient-specific information is then suitably used to adjust the average examination (or examination stage) time (e.g., statistics can be computed for patients with various chronic conditions such as obesity, COPD, or so forth) so that the average scan time used in the display/alerting is appropriate for the specific patient. Thus, for example, if the current examination is of an obese patient then the statistical average time for obese patients may be used, which may be longer than the statistical average time for all patients due to the increased difficulty in obese patient loading and positioning. Hence, the use of the patient-specific information can avoid issuing an erroneous alarm that the examination is running long.

In another example, if a bay camera is available then the imaging examination status monitoring can be extended to phases such as patient loading, patient unloading, and bay cleanup phases which are not reflected in the shared imaging display console. Thus, if the patient loading is taking unduly long the remote expert may be made aware of this.

It should be noted that the ROCC is not necessarily centralized at a single geographical location. In some embodiments, for example, the ROCC may comprise remote experts drawn from across an entire state, country, continent, or even drawn from across the world, and the ROCC is implemented as a distributed Internet-based infrastructure that provides data transfer (e.g. screen sharing and video feed transfer) and telephonic and/or video communication connectivity between the various experts and the imaging bays being assisted by those experts, and tracks time of the provided assistance, outcomes, and/or other metrics for billing or auditing purposes as may be called for in a given commercial implementation. Furthermore, in addition to the ROCC application, the disclosed systems and methods could find use in providing a central monitoring station for a larger medical institution or network. In such settings, the disclosed approach could be used to provide a radiology manager an overview of all imaging bays. Conversely, it is contemplated for the ROCC (more generally, assistance system) to have only a single remote expert on call at any given time.

With reference to FIG. 1, an apparatus for providing assistance from a remote medical imaging expert RE (or supertech) to a local technician operator LO is shown. As shown in FIG. 1, the local operator LO, who operates one or more medical imaging devices (also referred to as an image acquisition device, imaging device, and so forth) 2, is located in a medical imaging device bay 3, and the remote operator RE is disposed in a remote service location or center 4. It should be noted that the "remote operator" RE may not necessarily directly operate the medical imaging device 2, but rather provides assistance to the local operator LO in the form of advice, guidance, instructions, or the like. The remote location 4 can be a remote service center, a radiologist's office, a radiology department, and so forth. The remote location 4 may be in the same building as the medical imaging device bay 3 (this may, for example, in the case of a "remote operator" RE who is a radiologist tasked with peri-examination image review), but more typically the remote service center 4 and the medical imaging device bay 3 are in different buildings, and indeed may be located in different cities, different countries, and/or different continents. In general, the remote location 4 is remote from the imaging device bay 3 in the sense that the remote operator RE cannot directly visually observe the imaging device 2 in the imaging device bay 3 (hence optionally providing a video feed or screen-sharing process as described further herein).

The image acquisition device 2 can be a Magnetic Resonance (MR) image acquisition device, a Computed Tomography (CT) image acquisition device; a positron emission tomography (PET) image acquisition device; a single photon emission computed tomography (SPECT) image acquisition device; an X-ray image acquisition device; an ultrasound (US) image acquisition device; or a medical imaging device of another modality. The imaging device 2 may also be a hybrid medical imaging device such as a PET/CT or SPECT/

CT imaging system. While a single image acquisition device 2 is shown by way of illustration in FIG. 1, more typically a medical imaging laboratory will have multiple image acquisition devices, which may be of the same and/or different imaging modalities. For example, if a hospital performs many CT imaging examinations and relatively fewer MRI examinations and still fewer PET examinations, then the hospital's imaging laboratory (sometimes called the "radiology lab" or some other similar nomenclature) may have three CT scanners, two MRI scanners, and only a single PET scanner. This is merely an example. Moreover, the remote service center 4 may provide service to multiple hospitals, and a single remote expert RE may concurrently monitor and provide assistance (when required) for multiple imaging bays being operated by multiple local operators, only one of which local operator is shown by way of representative illustration in FIG. 1. The local operator controls the medical imaging device 2 via an imaging device controller 10. The remote operator is stationed at a remote workstation 12 (or, more generally, an electronic controller 12).

As used herein, the term "medical imaging device bay" (and variants thereof) refer to a room containing the medical imaging device 2 and also any adjacent control room containing the medical imaging device controller 10 for controlling the medical imaging device. For example, in reference to an MRI device, the medical imaging device bay 3 can include the radiofrequency (RF) shielded room containing the MRI device 2, as well as an adjacent control room housing the medical imaging device controller 10, as understood in the art of MRI devices and procedures. On the other hand, for other imaging modalities such as CT, the imaging device controller 10 may be located in the same room as the imaging device 2, so that there is no adjacent control room and the medical bay 3 is only the room containing the medical imaging device 2. In addition, while FIG. 1 shows a single medical imaging device bay 3, it will be appreciated that the remote service center 4 (and more particularly the remote workstation 12) is in communication with multiple medical bays via a communication link 14, which typically comprises the Internet augmented by local area networks at the remote operator RE and local operator LO ends for electronic data communications.

A screen mirroring data stream 18 is generated by a screen sharing or capture device 13, and is sent from the imaging device controller 10 to the remote workstation 12. The screen mirroring data stream 18 is provided by a screen sharing or capture device 13, which in some embodiments is a DVI splitter, a HDMI splitter, and so forth that provides a split of the DVI feed from the medical imaging device controller 10 to an external display monitor of the medical imaging device controller 10. In other embodiments, the live video feed 17 may be provided by a video cable connecting an auxiliary video output (e.g. aux vid out) port of the imaging device controller 10 to the remote workstation 12 of the operated by the remote expert RE. In yet other embodiments, the screen sharing or capture device 13 is embodied by the medical imaging device controller 10 itself running screen-sharing software. The screen mirroring data stream 18 is sent to the remote workstation 12 via the communication link 14, e.g. as a streaming video feed received via a secure Internet link.

As diagrammatically shown in FIG. 1, in some embodiments, a camera 16 (e.g., a video camera) is arranged to acquire a video stream 17 of a portion of the medical imaging device bay 3 that includes at least the area of the imaging device 2 where the local operator LO interacts with the patient, and optionally may further include the imaging device controller 10. The video stream 17 is also sent to the remote workstation 12 via the communication link 14, e.g. as a streaming video feed received via a secure Internet link.

The communication link 14 also provides a natural language communication pathway 19 for verbal and/or textual communication between the local operator and the remote operator. For example, the natural language communication link 19 may be a Voice-Over-Internet-Protocol (VOIP) telephonic connection, an online video chat link, a computerized instant messaging service, or so forth. Alternatively, the natural language communication pathway 19 may be provided by a dedicated communication link that is separate from the communication link 14 providing the data communications 17, 18, e.g. the natural language communication pathway 19 may be provided via a landline telephone. In another example, the natural language communication pathway 19 may be provided via an ROCC device 9, such as a mobile device (e.g., a tablet computer or a smartphone). For example, an "app" can run on the ROCC device 9 (operable by the local operator LO) and the remote workstation 12 (operable by the remote expert RE) to allow communication (e.g., audio chats, video chats, and so forth) between the local operator and the remote expert.

In some embodiments, one or more sensors 8 can additionally or alternatively be disposed in the medical imaging bay 3. The sensor(s) 8 are configured to collect data related to the events corresponding to the movement of the patient or medical personnel, in addition to the number of people, in the medical imaging bay 3. In one particular example, the sensor(s) 8 can include a radar sensor configured to detect persons in the medical imaging bay 3 containing the medical imaging device 2. The radar sensor could be in addition to, or in place of, the video camera 16.

FIG. 1 also shows, in the remote service center 4 including the remote workstation 12, such as an electronic processing device, a workstation computer, or more generally a computer, which is operatively connected to receive and present the video 17 of the medical imaging device bay 3 from the camera 16 and to present the screen mirroring data stream 18 as a mirrored screen from the screen capture device 13. Additionally or alternatively, the remote workstation 12 can be embodied as a server computer or a plurality of server computers, e.g. interconnected to form a server cluster, cloud computing resource, or so forth. The workstation 12 includes typical components, such as an electronic processor 20 (e.g., a microprocessor), at least one user input device (e.g., a mouse, a keyboard, a trackball, and/or the like) 22, and at least one display device 24 (e.g. an LCD display, plasma display, cathode ray tube display, and/or so forth). In some embodiments, the display device 24 can be a separate component from the workstation 12. The display device 24 may also comprise two or more display devices, e.g. one display presenting the video 17 and the other display presenting the shared screen of the imaging device controller 10 generated from the screen mirroring data stream 18. Alternatively, the video and the shared screen may be presented on a single display in respective windows. The electronic processor 20 is operatively connected with a one or more non-transitory storage media 26. The non-transitory storage media 26 may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the workstation 12, various combinations thereof, or so forth. It is to be understood that any reference to a non-transitory medium or media 26 herein is to be broadly construed as encompassing a single medium or multiple media of the same or different types. Likewise, the electronic processor 20 may be embodied as a single electronic processor or as two or more electronic processors. The non-transitory storage media 26 stores instructions executable by the at least one electronic processor 20. The instructions include instructions to generate a graphical user interface (GUI) 28 for display on the remote operator display device 24.

The medical imaging device controller 10 in the medical imaging device bay 3 also includes similar components as the remote workstation 12 disposed in the remote service center 4. Except as otherwise indicated herein, features of the medical imaging device controller 10, which includes a local workstation 12', disposed in the medical imaging device bay 3 similar to those of the remote workstation 12 disposed in the remote service center 4 have a common reference number followed by a "prime" symbol, and the description of the components of the medical imaging device controller 10 will not be repeated. In particular, the medical imaging device controller 10 is configured to display a GUI 28' on a display device or controller display 24' that presents information pertaining to the control of the medical imaging device 2, such as configuration displays for adjusting configuration settings an alert 30 perceptible at the remote location when the status information on the medical imaging examination satisfies an alert criterion of the imaging device 2, imaging acquisition monitoring information, presentation of acquired medical images, and so forth. It will be appreciated that the screen mirroring data stream 18 carries the content presented on the display device 24' of the medical imaging device controller 10. The communication link 14 allows for screen sharing between the display device 24 in the remote service center 4 and the display device 24' in the medical imaging device bay 3. The GUI 28' includes one or more dialog screens, including, for example, an examination/scan selection dialog screen, a scan settings dialog screen, an acquisition monitoring dialog screen, among others. The GUI 28' can be included in the video feed 17 or the mirroring data stream 18 and displayed on the remote workstation display 24 at the remote location 4.

FIG. 1 shows an illustrative local operator LO, and an illustrative remote expert RE (i.e. expert, e.g. supertech). However, in a Radiology Operations Command Center (ROCC) as contemplated herein, the ROCC provides a staff of supertechs who are available to assist a local operators LO at different hospitals, radiology labs, or the like. The ROCC may be housed in a single physical location, or may be geographically distributed. For example, in one contemplated implementation, the remote operators RO are recruited from across the United States and/or internationally in order to provide a staff of supertechs with a wide range of expertise in various imaging modalities and in various imaging procedures targeting various imaged anatomies. In view of this multiplicity of local operators LO and multiplicity of remote operators RO, the disclosed communication link 14 includes a server computer 14s (or a cluster of servers, cloud computing resource comprising servers, or so forth) which is programmed to establish connections between selected local operator LO/remote expert RE. For example, if the server computer 14s is Internet-based, then connecting a specific selected local operator LO/remote expert RE can be done using Internet Protocol (IP) addresses of the various components 16, 10, 12, 8, 9, the telephonic or video terminals of the natural language communication pathway 19, et cetera. The server computer 14s is operatively connected with a one or more non-transitory storage media 26s. The non-transitory storage media 26s may, by way of non-limiting illustrative example, include one or more of a magnetic disk, RAID, or other magnetic storage medium; a solid state drive, flash drive, electronically erasable read-only memory (EEROM) or other electronic memory; an optical disk or other optical storage; various combinations thereof; or so forth; and may be for example a network storage, an internal hard drive of the server computer 14s, various combinations thereof, or so forth. It is to be understood that any reference to a non-transitory medium or media 26s herein is to be broadly construed as encompassing a single medium or multiple media of the same or different types. Likewise, the server computer 14s may be embodied as a single electronic processor or as two or more electronic processors. The non-transitory storage media 26s stores instructions executable by the server computer 14s. In addition, the non-transitory computer readable medium 26s (or another database) stores data related to a set of remote experts RE and/or a set of local operators LO. The remote expert data can include, for example, skill set data, work experience data, data related to ability to work on multi-vendor modalities, data related to experience with the local operator LO and so forth.

Furthermore, as disclosed herein the server 14s performs a method or process 100 of providing remote monitoring of a local operator LO of the medical imaging device 2 during a medical imaging examination.

With continuing reference to FIG. 1, in one embodiment of the method or process 100, the server 14s is programmed with several components to provide monitoring of the imaging examination, for use by remote expert RE during an assistance call, and also as disclosed herein to collect historical information on completed imaging examinations. An image processing module 32 is provided for processing image frames of the screen mirroring data stream 18 as a portion of a method or process 100 of providing assistance to the local operator during a medical imaging examination. The images (i.e. screen sharing image frames) are extracted from the screen mirroring data stream 18 received via the communication link 14. The processing of the screen mirroring image frames by the image processing module 32 extracts relevant information such as an operator identifier that identifies the local operator LO, imaging examination workflow events such as the start and end of the imaging examination, the start and end of a particular stage of the imaging examination, and so forth. Other information may be extracted such as the make and model of the medical imaging device, the type of imaging examination being performed, patient information that is entered into the imaging device controller 10, and/or so forth. It is noted that for the disclosed approach, this data collection is performed during each examination (or at least for many examinations) performed using the imaging device 2, regardless of whether the local operator LO is requesting assistance from the remote expert RE. Even if the collected imaging examination information is not used for an assistance call, the collected information provides a database of historical data on completed imaging examinations from which completion time statistics are suitably derived. The various pieces of information extracted by the image processing module 32 are referred to herein as image features. The image processing module 32 also assigns timestamps to the image features based on the timestamps of the image frames (or groups of image frames) of the screen mirroring data stream 18 from which the image features are extracted.

A statistical modeler module 42 is configured to receive the image features extracted from the screen mirroring data stream 18 by the image processing module 32, and optionally may also collect or retrieve historical data from a database 31 (e.g., an HL-7 database, an electronic medical record (EMR) database, an electronic health database (EHR), a health information system (HIS) database, a radiology information system (RIS) database, a digital imaging communication in medicine (DICOM) database, and so forth), the sensors 8, and/or the video feed 17 acquired by the camera 16. The statistical modeler module 34 is configured to map the image features extracted from the screen mirroring data stream 18 by the image processing module 32 to completed medical imaging examinations based at least on the timestamps of the image features, and to convert the image features mapped to each completed medical imaging examination into a representation 43 of the completed medical imaging examination. The representation of the completed medical imaging examination includes at least one completion time for the completed medical imaging examination. This may, for example, include a completion time for the completed medical imaging examination as a whole, and/or a completion time for one or more stages of the completed medical imaging examination. The statistical modeler module 42 then fits one or more statistical models to the completion times or other quantitative aspects of the representations of the completed medical imaging examinations. The statistical models may be applied to the entire set of completed medical imaging examinations, or so some subset defined by filters such as location and identification of the imaging device 2, the type of imaging examination (e.g., "MR brain scan"), an identification of the local operator LO, patient demographics (e.g., age, gender, and so forth), and so forth. The resulting historical data can be represented as a distribution of values (e.g. imaging examination completion time (i.e. duration) in minutes, for the entire set of completed medical imaging examinations or for some subset such as a subset of technologists who have performed various exam types, etc.).

To map the image features to completed medical imaging examinations based at least on the timestamps of the image features, the statistical modeler module 42 is configured to use temporal matching algorithms to map the timestamps of the image features and/or timestamps of other collected information such as information from sensors 8 or the camera 16 to specific completed imaging examinations. This mapping can suitably use temporal matching algorithms operating on the timestamps to create clusters such that the features in the same cluster refer to the same imaging examination and features in different clusters refer to different entities. Temporal matching is well-suited to this task since successive imaging examinations are likely to be spaced apart in time by intervals during which the imaged patient is discharged and the next patient is admitted for an imaging examination. Hence, the timestamps are expected to form well-defined clusters spaced apart by discharge/admission time intervals. Temporal agreement/disagreement probability metrics are suitably used to perform this clustering operation. The statistical modeler module 42 is further configured to generate statistics on examination completion times or other quantitative examination metrics by producing point-statistic estimates (e.g., mean, median, min, max, variance, etc.) for the distributions from the historical data when appropriate.

A comparison and alerting module 44 is configured to compare a progression of the current imaging examination to the historical data, and determines if an alert 30 needs to be raised to the remote expert RE. The comparison and alerting module 44 optionally can account for patient context and the user context for determining when, how and which local operator LO to alert. This is suitably done by computing the completion time (or other competed examination) statistics for different subsets of the set of completed imaging examinations, e.g. the alerting module 44 may compare the current status of a current examination of an obese patient with the statistics generated by the statistical modeler module 42 for the subset of completed examinations performed on obese patients.

In some embodiments, the comparison and alerting module 34 is configured to compare the elapsed and remaining time of the current imaging examination to a simple threshold derived from the historical data (e.g. an upper quartile of the imaging examination time for the current imaging examination type for the performing local operator LO) and an alert 30 is raised if the total time is beyond this threshold.

In other embodiments, the comparison and alerting module 44 is configured to implement a machine learning algorithm and/or a reinforcement learning agent to learn from the available data and determine when to alert the remote expert RE, including feedback from the remote expert RE. This algorithm can learn the preferences of the remote expert RE on which data to display and how to display the data based on how often each available visualization is used to make sure the visualized data is actionable. In this embodiment, each intervention of the remote expert RE user to the local operator LO is a signal for the learning agent. Using a combination of thresholds from the historical data and interactions with the remote expert RE, the algorithm learns to adapt to the preferences of the remote expert RE. It would be rewarded when it causes the remote workstation 12 to displays the correct data on the right format and punished when it does not. For example, the algorithm can cause the remote workstation 12 to display a standard alert 30 when the elapsed and remaining time goes beyond the upper quartile of the historical data for this imaging examination for the local operator LO. The remote expert RE can dismiss the alert 30 when, for example, the remote expert RE checks the patient's age and realize that because patient is a child, and thus the imaging examination is expected to take longer than an imaging examination for an adult patient. This can be a signal for the reinforcement learning algorithm to not alert the remote expert RE the next time a patient with similar demographics is undergoing an imaging examination. In another example, the comparison and alerting module 34 can learn, for example, how the remote expert RE arranges different windows on the GUI 28, and display the windows in this arrangement in the future.

The non-transitory computer readable medium 26s of the server computer 14s can store instructions executable by the server computer to perform the method 100 of providing remote monitoring of the local operator LO of the medical imaging device 2 during a medical imaging examination.

Figure 2:
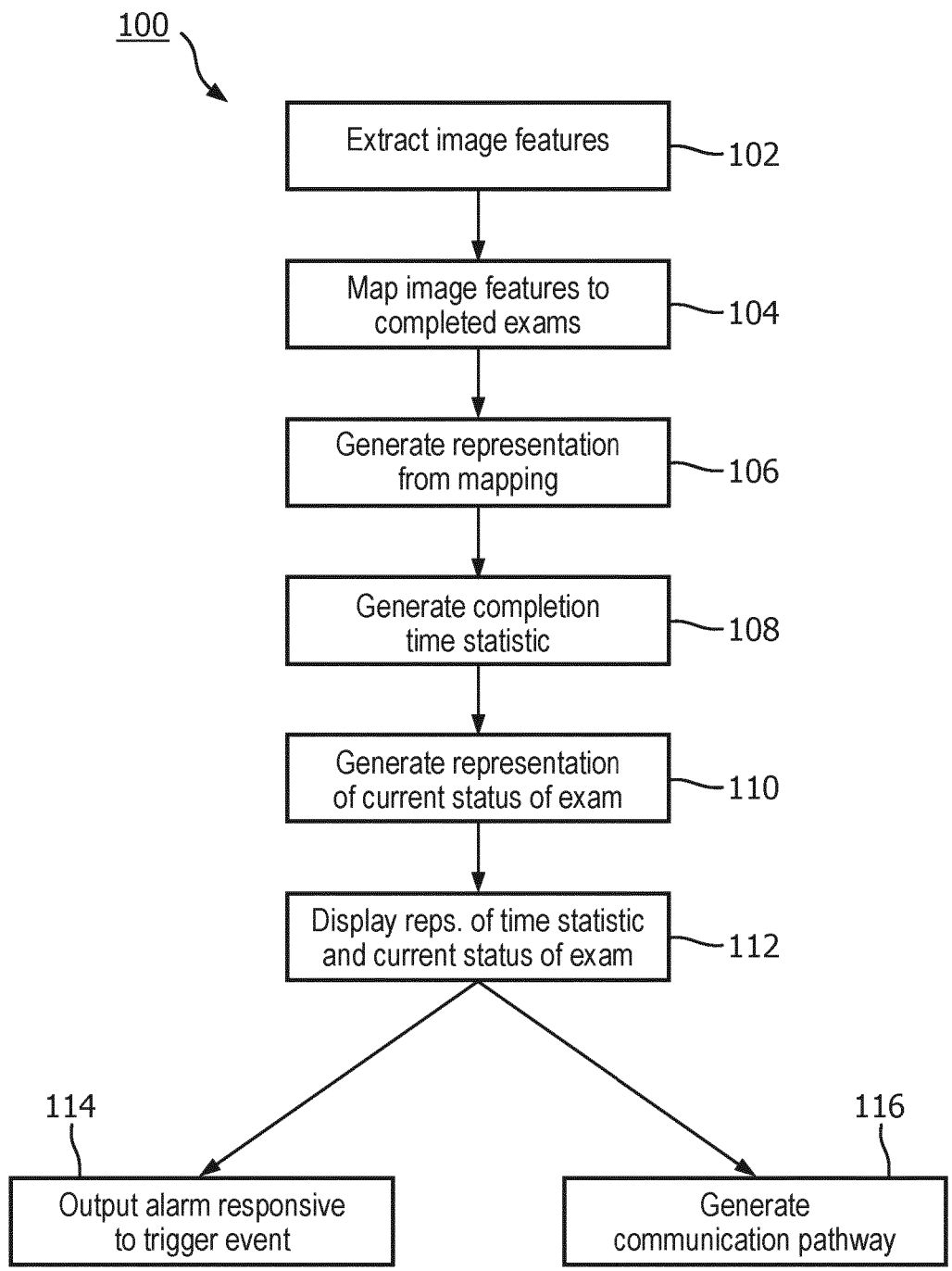
FIG. 2 shows an example flow chart of operations suitably performed by the apparatus of FIG. 1.

With reference to FIG. 2, and with continuing reference to FIG. 1, an illustrative embodiment of the monitoring method 100 is diagrammatically shown as a flowchart. To begin the monitoring method 100, at an operation 102, image features from image frames of the screen mirroring data stream 18 are extracted.

In one example, the image features can be extracted using the screen sharing device 13 (i.e., running screensharing software) of the medical imaging device controller 10 with the remote workstation 12. In another example, the image features are extracted from the video feed 17 captured by the camera 16 and transmitted to the remote workstation 12. This latter option is useful, for example, if monitoring a stage of the imaging examination such as patient loading in which the imaging device controller 10 is not involved (or at least is not heavily involved). The extracted information from the image features includes one or more of: an identification of the local operator LO, a modality of the medical imaging device 2, a type of imaging examination being performed using the medical imaging device, and a progress of a current medical imaging examination, a completion time of the medical imaging examination, and/or an elapsed time of the imaging examination, along with a position of image features on the display device 24' of the medical imaging device controller 10; textual labels of the image features; a type of information of the image features; type of encoding of the image features; a type of formatting of the image features; a translation table or icon of the image features; and a shape or color of the image features, and so forth. In some examples, patient data can be retrieved from the database 31, and features can be extracted from the patient data.

The extracting operation 102 can be performed in a variety of manners. In one example, the extraction includes performing an OCR process on the image frames to extract textual information. In another example, a corresponding dialog screen template 39 (stored in the non-transitory computer readable medium 26s of the server computer 14s) that corresponds to a dialog screen depicted in an image frame is identified. The corresponding dialog screen template 39 identifies one or more screen regions and associates the one or more screen regions with settings of the medical imaging examination. The extracted image features are extracted from the image frames and associated extracted information in the one or more screen regions with settings of the medical imaging examination using the associations provided by the corresponding dialog screen template 39.

At an operation 104, the extracted image features are mapped to medical imaging examinations based at least on timestamps of the image features. The medical imaging examinations to which the image features are mapped include completed medical imaging examinations and a current medical imaging examination. The mapping operation 104 can be performed by the statistical modeler module 32. The mapping operation 104 includes mapping the extracted image features to specific imaging examinations based on the timestamps, for example using a temporal matching algorithm as previously described.

At an operation 106 also suitably performed by the statistical modeler module 42, the image features mapped to each completed medical imaging examination are converted into a representation 43 of the completed medical imaging examination. The representation 43 of the completed medical imaging examination can include at least one completion time for the completed medical imaging examination, such as a completion time of the imaging examination as a whole, or completion times for various stages, sequences, or phases of the imaging examination.

At an operation 108 also performed by the statistical modeler module 42, from this representation 43, at least one completion time statistic 45 representing the completion times for the completed medical imaging examinations or a subset of the completed medical imaging examinations can be generated. These completion time statistics can include an average imaging examination completion time, and/or a standard deviation for the completion time. These could be for all completed examinations, or only for those completed examinations performed by the current local operator LO. In another embodiment, the at least one completion time for the completed medical imaging examination includes an examination completion time for the completed medical imaging examination. The at least one completion time statistic comprises an average examination completion time which is the average of the examination completion times of the completed medical examinations or the subset of the completed medical imaging examinations, and/or a standard deviation of the examination completion time which is the standard deviation of the examination completion times of the completed medical examinations or the subset of the completed medical imaging examinations.

The operations 102, 104 are suitably performed on an ongoing basis to collect image features for imaging examinations. The operations 106, 108 are performed to generate actionable statistics on completed imaging examinations. These operations 106, 108 may be performed in real-time to dynamically update the completed examination statistics as each examination is completed. However, such real-time dynamic updating can be computationally costly. In another approach, the operations 106, 108 are performed occasionally, e.g. once a week, once a month, or so forth.

The operations 110, 112, 114, and 116 of FIG. 2 are performed dynamically, in real-time during a current imaging examination. The operations 112, 114, and 116 utilize the statistic(s) for completed imaging examinations generated by the operations 106, 108. The most up-to-date statistics are preferably used, e.g. if the operations 106, 108 are performed once a month then the statistics generated in the most recent month are suitably used.

At the operation 110, the image features mapped to the current medical imaging examination are converted into a representation 47 of a current status of the current medical imaging examination. The representation 47 includes at least an elapsed time of the current medical imaging examination, such as, for example, and elapsed time for the current imaging examination as a whole and/or an elapsed time for a current stage, sequence, or phase of the imaging examination.

The operations 106, 108, and 110 can be performed in a variety of manners. In one example embodiment, the representation 43 of each completed medical imaging examination further includes an operator identifier that identifies the local operator LO who performed the completed medical imaging examination, and the representation 47 of the current status of the current medical imaging examination further includes a current operator identifier that identifies a local operator LO who is performing the current medical imaging examination. In this embodiment, the at least one completion time statistic 45 is generated for the subset of the completed medical imaging examinations whose operator identifiers match the current operator identifier.

In another example embodiment, the representation 43 of the completed medical imaging examination further includes a hospital identification that identifies a hospital where the completed medical imaging examination was performed, and the representation 47 of the current status of the current medical imaging examination further includes a current hospital identification that identifies a hospital where the current medical imaging examination is being performed. In this embodiment, the at least one completion time statistic 45 is generated for the subset of the completed medical imaging examinations whose hospital identification matches the current hospital identification.

In yet another example embodiment, the representation 47 of the current status of the current medical imaging examination includes a current stage of the current medical imaging examination and the elapsed time of the current imaging examination includes the elapsed time for the current stage of the completed medical imaging examination. The at least one completion time for the completed medical imaging examination includes an examination stage completion time corresponding to the current stage of the current medical imaging examination. The at least one completion time statistic 45 includes an average examination stage completion time which is the average of the examination stage completion times of the completed medical examinations or the subset of the completed medical imaging examinations, and/or a standard deviation of the examination stage completion time which is the standard deviation of the examination stage completion times of the completed medical examinations or the subset of the completed medical imaging examinations.

In another example embodiment, to generate the representation 43 of the completed medical imaging examination and the representation 47 of the current status of the current medical imaging examination, the extracted image features can be input into a generic imaging examination workflow model that is independent of a format of the image features displayed on the display device 24' of the controller 10 operable by the local operator LO.

Once the representations 43, 45, 47 are generated, at an operation 112, during the current medical imaging examination, the representation 45 of the current status of the current medical imaging examination on the workstation 12 during the imaging examination. That is, the representation 45 of the current status of the current medical imaging examination is displayed on a device separate from the medical imaging device 2. While displaying the representation 43 of the current status of the current medical imaging examination on the workstation 12, a representation of the at least one completion time statistic 45 is additionally displayed on the workstation 12.

In one example embodiment of the displaying operation 112, when the at least one completion time statistic 45 includes an average completion time, the displaying of the representation 47 of the current status of the current medical imaging examination on the workstation includes displaying a graphical representation of the elapsed time of the current medical imaging examination. In addition, the displaying of the representation of the at least one completion time statistic 45 includes displaying the average completion time as a graphical representation superimposed on the graphical representation of the elapsed time.

In another example embodiment, the at least one completion time statistic 45 includes a standard deviation of the completion time, and the displaying of the representation 47 of the current status of the current medical imaging examination further includes displaying the standard deviation of the completion time as a second graphical representation 49 superimposed on the graphical representation 47 of the elapsed time.

In other embodiments, the graphical representation of the elapsed time 47 comprises a time bar plot and the graphical representation of the average completion time 45 is displayed on or adjacent the time bar plot. In another example, the graphical representation of the elapsed time 47 comprises a time bar plot and the graphical representation 45 of the standard deviation is displayed on or adjacent the time bar plot.

These representations 43, 45, 47 can be displayed using a standard display format that is independent of the medical imaging device 2 operated by the local operator LO during the medical imaging examination.

In some embodiments, the method 100 includes an operation 114, in which a trigger event can be identified based on a comparison of the elapsed time of the current medical imaging examination and the at least one completion time statistic 45, at which an action needs to be taken by the remote expert RE and/or the local operator LO. An alert 30 indicating the trigger event can then be output via the GUI 28 of the remote workstation 12 (or be audibly output by the workstation 12).

To provide the assistance functionality of the ROCC, the method 100 further includes an operation 116 via which the local operator LO is assisted by the remote expert RE, in which the communication pathway 19 is established between the local operator LO (via the ROCC service device 9) and the remote expert RE (via the remote workstation 12). To do so, a clickable icon 48 selectable by the remote expert RE can be displayed on the GUI 28 to initiate a videoconferencing call ore telephone call via the communication pathway 19 with the local operator LO. Advantageously, the remote expert RE may be prompted to do this based on an alarm output at the operation 114; or may decide to initiate the call based on review of the display generated at operation 112 which provides a readily comprehended representation of the status of the current examination as compared with the statistical average completion time from the historical, i.e. completed, imaging examinations.

Although primarily described in terms of a single medical imaging device bay 3 housing a single medical imaging device 2, the method 100 can be performed at a plurality of sites including medical imaging devices operated by a corresponding number of local operators, and the representations 43, 45, 47, 49 can include information from the sites of the plurality of sites. For example, the operation 102 can include obtaining images from a plurality of medical imaging devices 2 during multiple medical imaging examinations and extracting image features from image frames of the screen mirroring data stream 18. The operation 110 can then include generating a metric, such as the representation 47, indicative of a progression of each medical imaging examinations using the plurality of medical imaging devices 2. The displaying operation 112 can include displaying the representation 47 for each medical imaging examination on the remote workstation 12 for the remote expert RE to monitor the progress of the imaging procedures.

Figure 3:
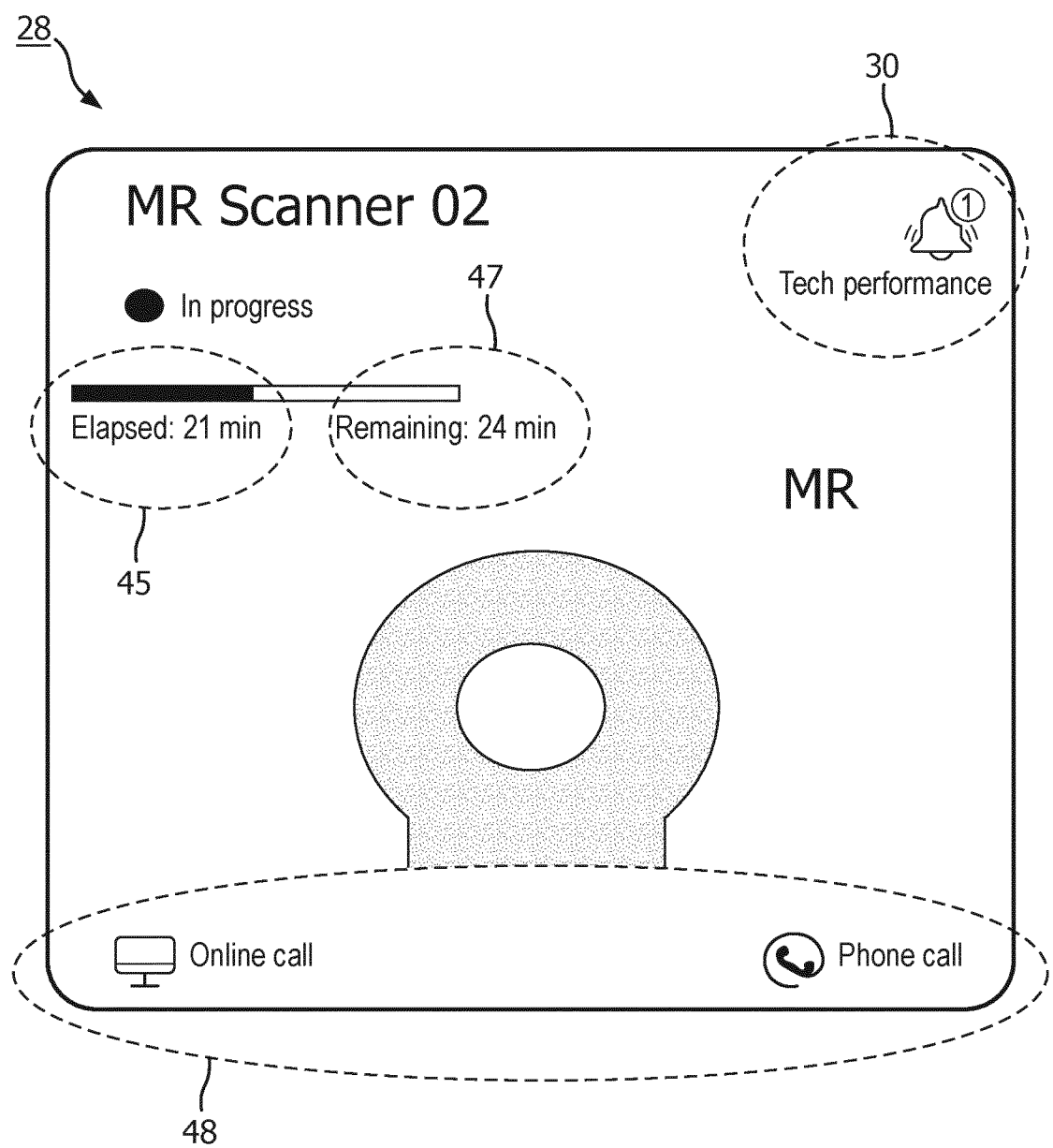
FIGS. 3-8 show examples of an interface output generated by the apparatus of FIG. 1.

FIGS. 3-8 show different examples of the representations 43, 45, 47 as displayed on the GUI 28 of the remote workstation 12. As shown in FIG. 3, an alert 30 is shown (e.g. the bell indicator with the text "tech performance") to the remote expert RE whenever the elapsed and remaining time exceeds a given threshold (e.g. an upper quartile of the examination time for the current examination type for the performing local operator LO). In another embodiment, the alert 30 can be raised by comparison and alerting module 44. The remote expert RE can then click on the alert 30 to decide if an intervention is needed. The remote expert RE input will then become another signal for the learning agent of the comparison and alerting module 44.

Figure 4:
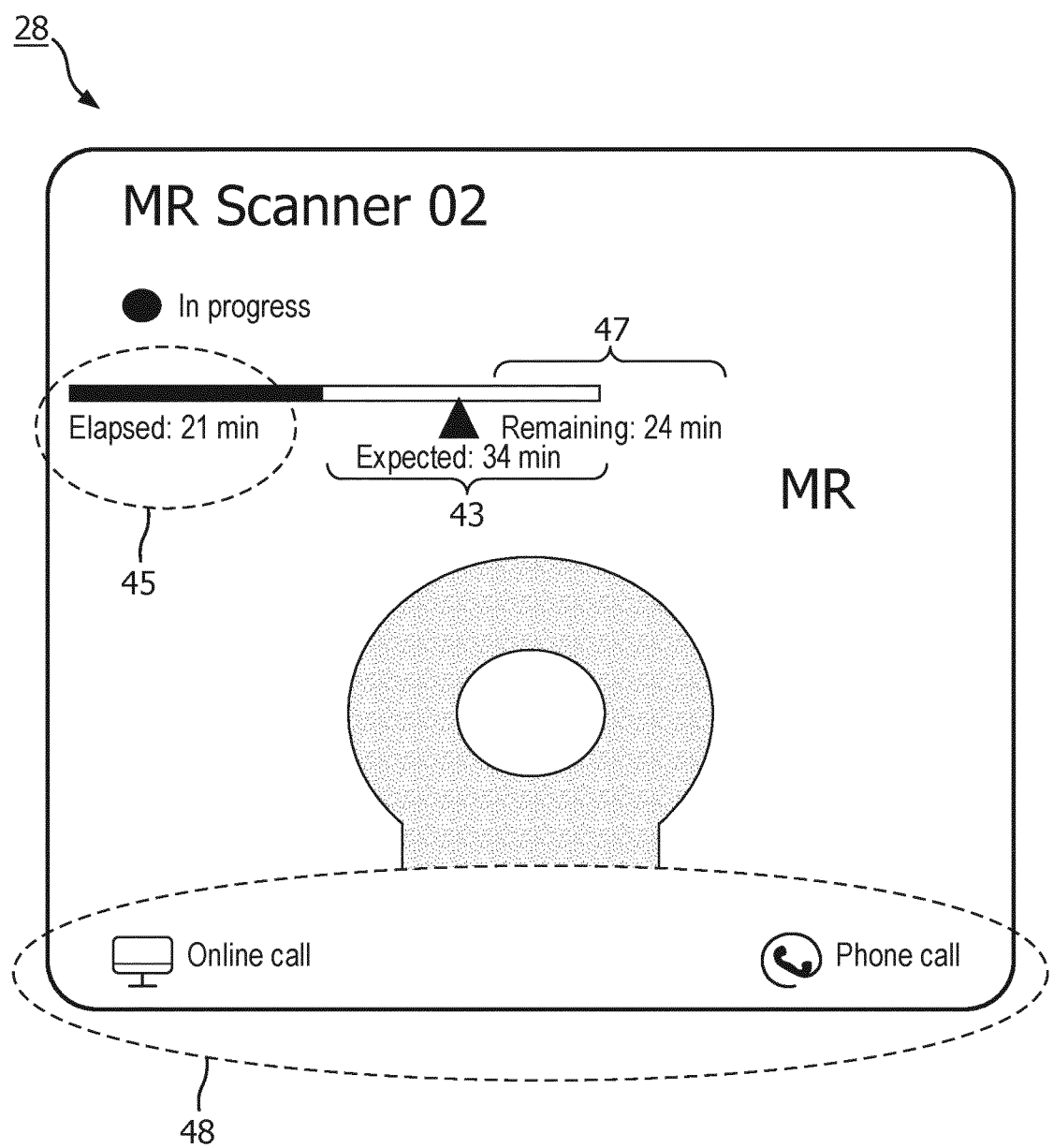

As shown in FIG. 4, the representation 45 of the current medical examination is shown as an expected time of a current imaging examination displayed solely as a single-point estimation on top of a progress bar. The further the remaining time is from the expected value, the more likely that the examination is not going as planned and the more likely that there are reasons why the remote expert RE should intervene.

Figure 5:
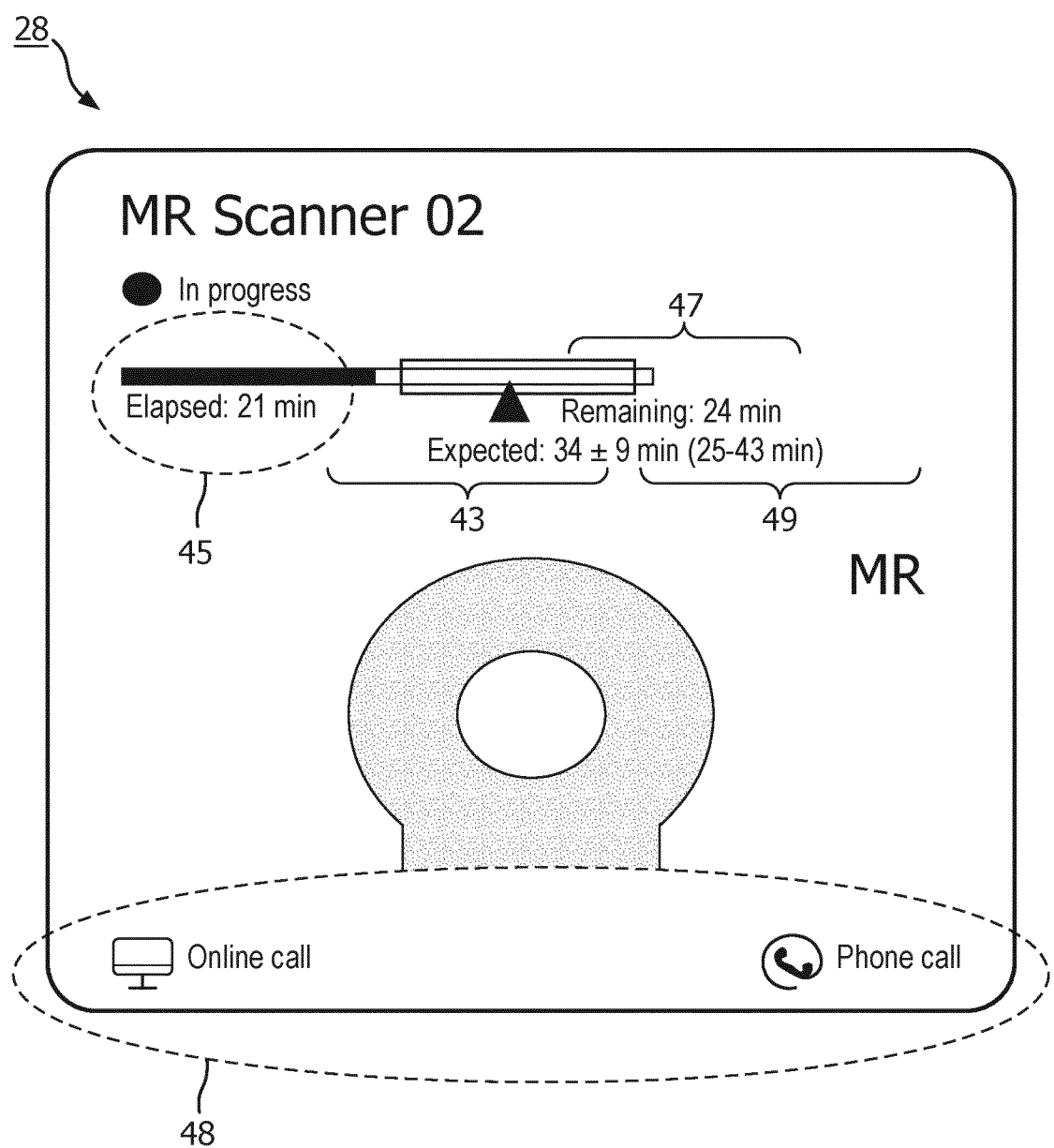

As shown in FIG. 5, the representation 45 of the current medical examination is shown as an expected time of an imaging exam is displayed with a time-window of plus or minus ½ standard deviation as the second representation 49. In this case, the farther the remaining time is from the expected time and the standard time window, the more likely that the examination is not going as planned and the more likely that there are reasons why the remote expert RE should intervene.

Figure 6:
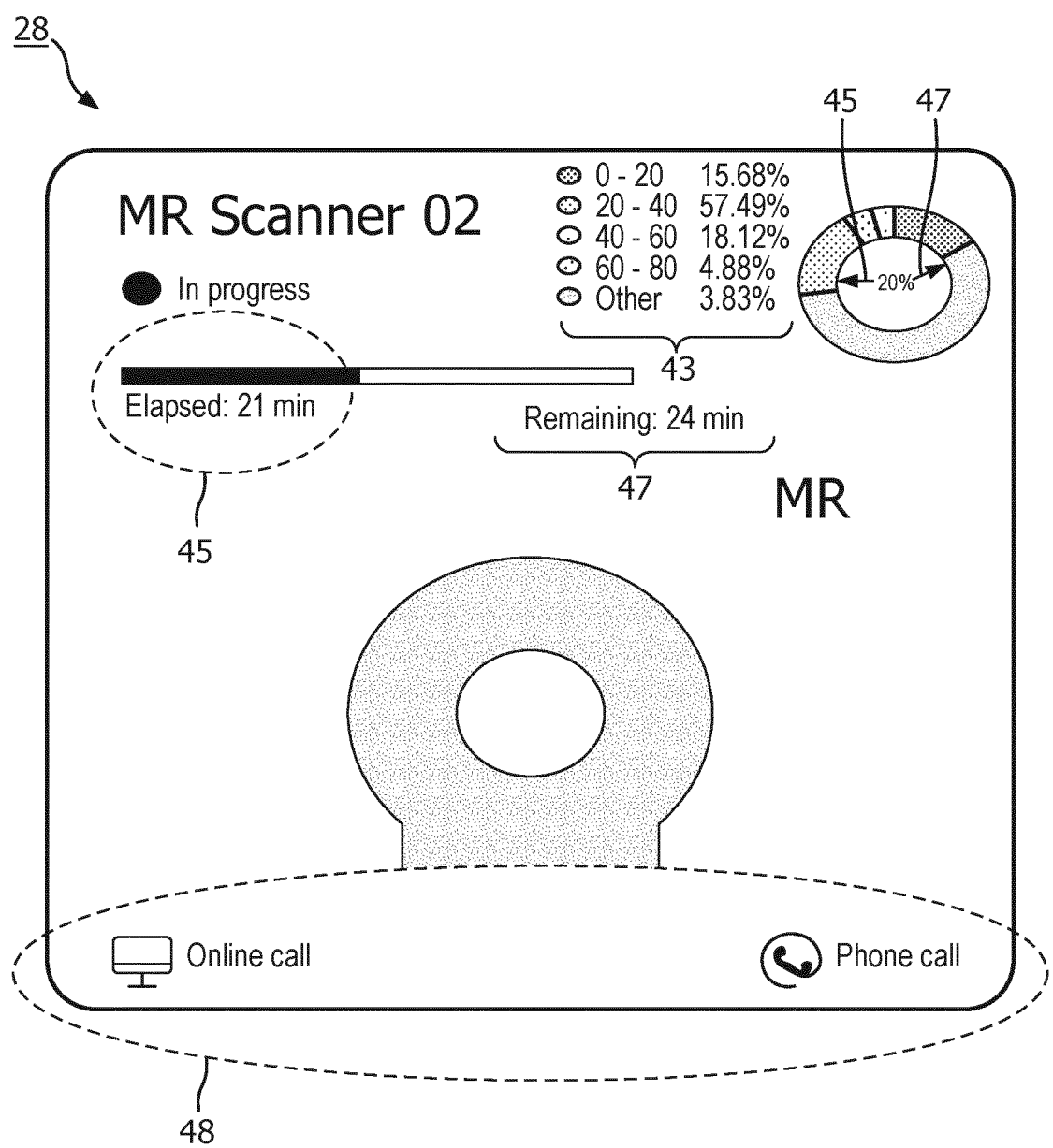

As shown in FIG. 6, the representation 45 of the current medical examination is shown as a distribution of imaging examination duration as a pie chart, and the elapsed and remaining times representation 45, 47 are additionally displayed with arrows on top of the pie chart, similar to a clock. In this case, the 6 pm of the "clock" corresponds to the mean or median of the examination time duration distribution and whenever the remaining time indicator goes past the 6 pm mark, the more likely that the examination is not going as planned and the more likely that there are reasons why the remote expert RE should intervene. As shown in FIG. 6, the examination takes anywhere from 20-40 minutes 57% of the time, and mean time is around 30 minutes. Since 21 minutes has already elapsed and the remaining time is still around 24 minutes, the remote expert RE might consider intervening.

Figure 7:
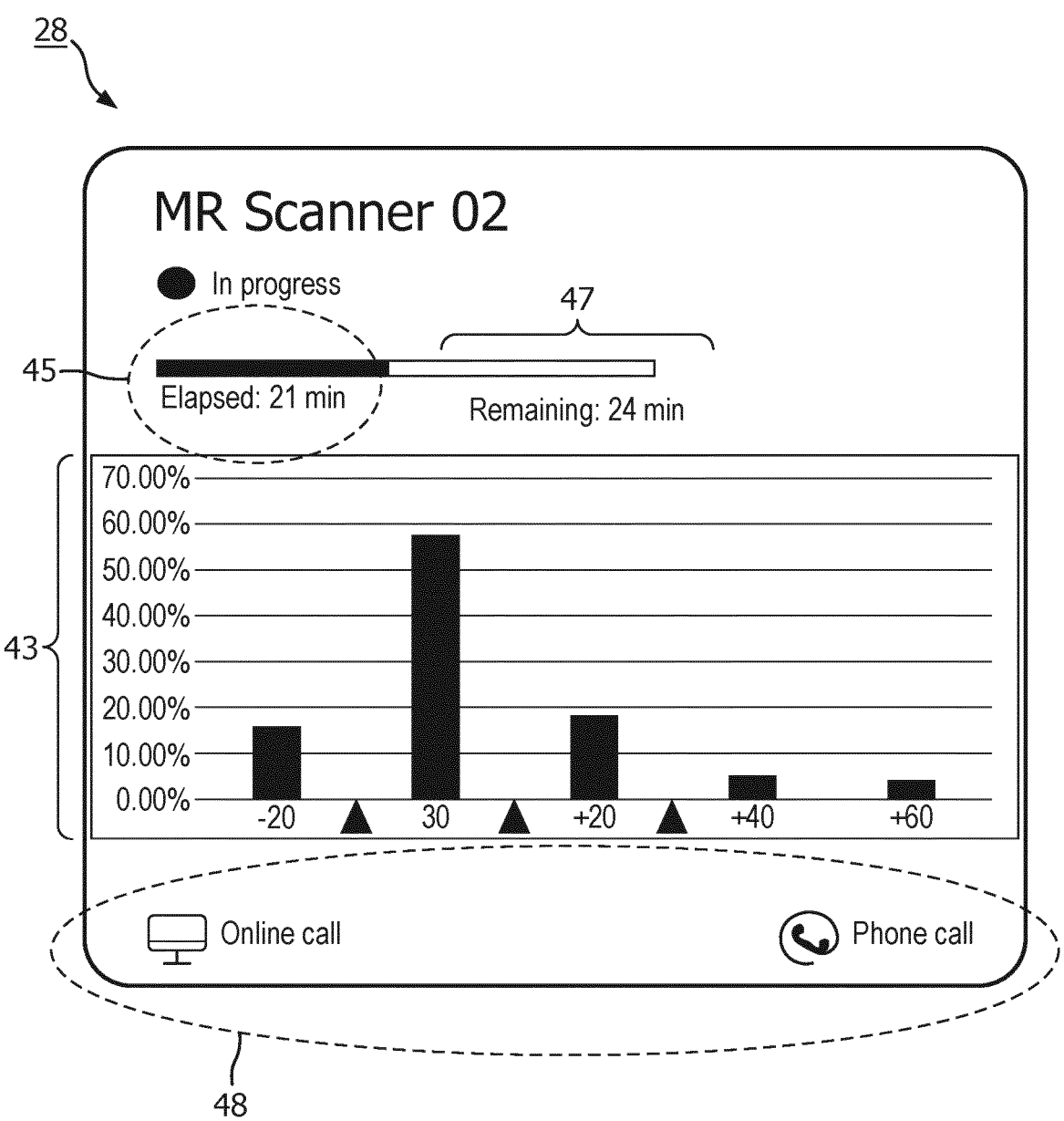

As shown in FIG. 7, the representation 45 of the current medical examination is shown as distribution of time represented as a histogram with the most expected time represented on the x-axis in the middle and then the tail ends of the distribution are represented relatively, by adding and subtracting minutes. A y-axis shows the percentage of times the examinations have completed in that time frame. The elapsed time in the current examination, remaining time in the current examination and the scheduled arrival of the next patient are represented on the distribution using different markers. In this embodiment, if the remaining time marker is too close to the next patient's arrival, or if the elapsed and remaining time markers are falling too close to the right side of the distribution, the more likely that the examination is not going as expected, and has the potential to disrupt downstream workflow and the more likely remote expert RE might have a reason to intervene.

Figure 8:
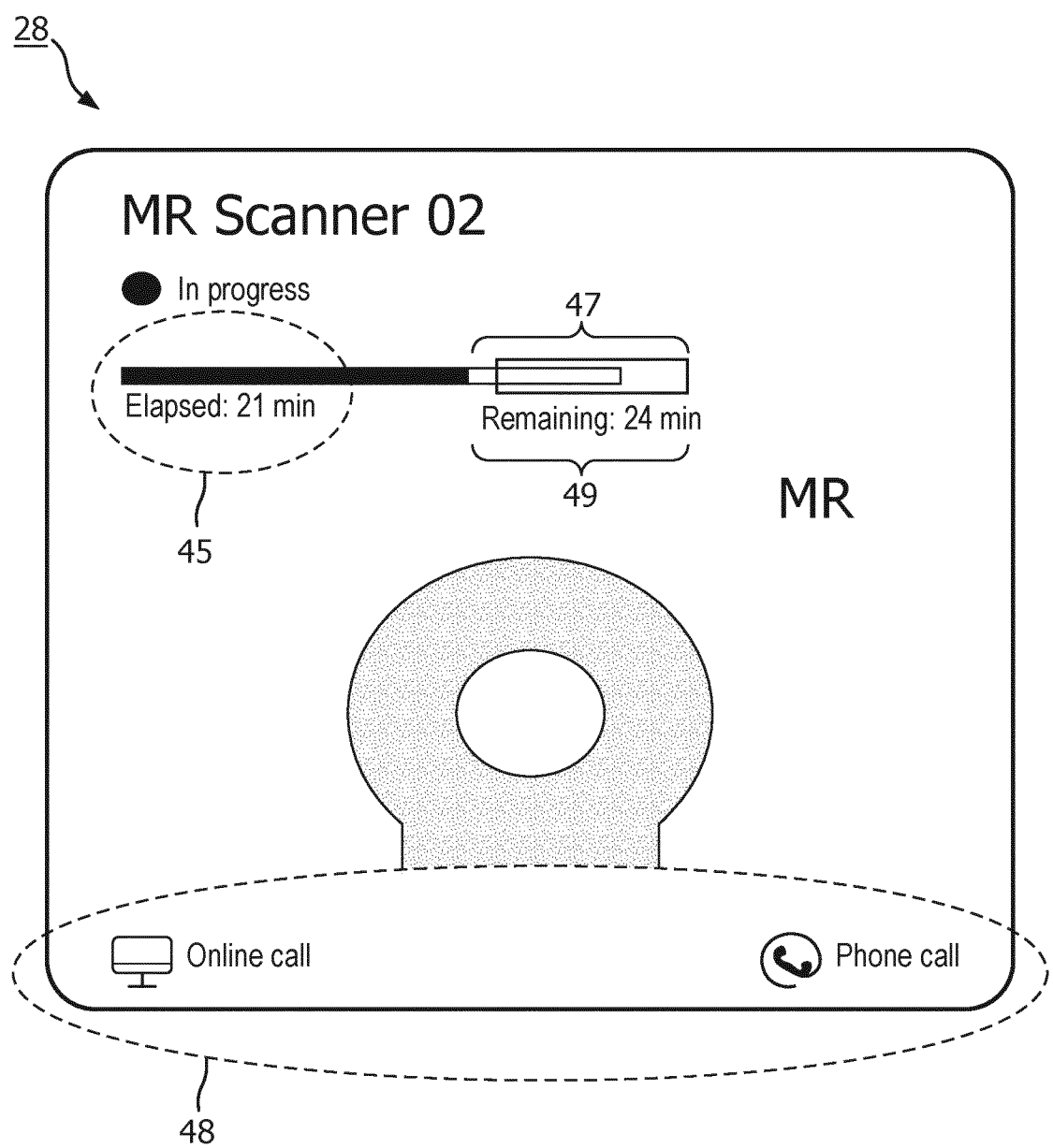

As shown in FIG. 8, the representation 45 of the current medical examination is shown as a progression of different sequences of the examination. A standard-deviation time window 49 is overlaid on the progress bar 47 that displays the progression of sequences. There are three sequences that needs to be completed, two of them are completed so far, and the local operator LO is imaging the third sequence currently, which falls within the expected time window from the historical data.

FIGS. 3-8 show various representations of the time statistic and current status of the current imaging examination generated by the operation 112 and displayed on the GUI 28. These representations of FIGS. 3-8 are for a single current imaging examination. However, it is to be appreciated that in a scaled-up ROCC, the remote expert RE may be charged with monitoring a number of different imaging examinations that are being performed concurrently in different imaging bays (which, in turn, may in some embodiments be located in different cities, different states, or even different countries). To enable the remote expert RE to keep track of all these concurrent imaging examinations, in some embodiments the GUI 28 provides a grid display, with one representation of the type shown in FIGS. 3-8 being depicted for each imaging examination. Hence, for example, if the remote expert RE is charged with monitoring 12 imaging examinations that are being performed concurrently, then the grid will include 12 representation corresponding to the 12 imaging examinations, with each representation being suitably formulated as one of the examples of FIGS. 3-8. In this way, the remote expert RE can quickly, at a glance, assess the status of each current imaging examination as compared against the statistical completion time for that type of imaging examination; and can thereby quickly identify if any imaging examination seems to be experiencing a problem as indicated by its elapsed time exceeding the statistical completion time. This enables the remote expert RE to take proactive action, such as initiating a videoconference with the local operator LO performing the imaging examination that is experiencing a problem. Similarly, the alarm operation 114 can provide the prompt for the remote expert RE to initiate the videoconference.

The disclosure has been described with reference to the preferred embodiments. Modifications and alterations may occur to others upon reading and understanding the preceding detailed description. It is intended that the exemplary embodiment be construed as including all such modifications and alterations insofar as they come within the scope of the appended claims or the equivalents thereof.

The invention claimed is:

1. A non-transitory computer readable medium storing instructions executable by at least one electronic processor to perform a method of providing remote monitoring of a local operator of a medical imaging device during a medical imaging examination, the method comprising:

extracting image features from image frames displayed on a display device of a controller of the medical imaging device during medical imaging examinations performed using the medical imaging device;

mapping the image features to medical imaging examinations based at least on timestamps of the image features, the medical imaging examinations to which the image features are mapped including completed medical imaging examinations and a current medical imaging examination;

converting the image features mapped to each completed medical imaging examination into a representation of the completed medical imaging examination, wherein the representation of the completed medical imaging examination includes at least one completion time for the completed medical imaging examination;

generating at least one completion time statistic representing the completion times for the completed medical imaging examinations or a subset of the completed medical imaging examinations;

converting the image features mapped to the current medical imaging examination into a representation of a current status of the current medical imaging examination including at least an elapsed time of the current medical imaging examination;

during the current medical imaging examination, displaying the representation of the current status of the current medical imaging examination on a workstation that is separate from the medical imaging device; and while displaying the representation of the current status of the current medical imaging examination on the workstation, additionally displaying a representation of the at least one completion time statistic on the workstation.

2. The non-transitory computer readable medium of claim 1, wherein:

the representation of the completed medical imaging examination further includes an operator identifier that identifies the local operator who performed the completed medical imaging examination;

the representation of the current status of the current medical imaging examination further includes a current operator identifier that identifies a local operator who is performing the current medical imaging examination; and the at least one completion time statistic is generated for the subset of the completed medical imaging examinations whose operator identifiers match the current operator identifier.

3. The non-transitory computer readable medium of claim 1, wherein:

the representation of the completed medical imaging examination further includes a hospital identification that identifies a hospital where the completed medical imaging examination was performed;

the representation of the current status of the current medical imaging examination further includes a current hospital identification that identifies a hospital where the current medical imaging examination is being performed; and the at least one completion time statistic is generated for the subset of the completed medical imaging examinations whose hospital identification matches the current hospital identification.

4. The non-transitory computer readable medium of claim 1, wherein the at least one completion time for the completed medical imaging examination includes an examination completion time for the completed medical imaging examination, and the at least one completion time statistic comprises one or more of:

an average examination completion time which is the average of the examination completion times of the completed medical examinations or the subset of the completed medical imaging examinations; and a standard deviation of the examination completion time which is the standard deviation of the examination completion times of the completed medical examinations or the subset of the completed medical imaging examinations.

5. The non-transitory computer readable medium of claim 1, wherein:

the representation of the current status of the current medical imaging examination includes a current stage of the current medical imaging examination and the elapsed time of the current imaging examination includes the elapsed time for the current stage of the completed medical imaging examination, the at least one completion time statistic for the completed medical imaging examination includes an examination stage completion time corresponding to the current stage of the current medical imaging examination; and the at least one completion time statistic comprises one or more of:

an average examination stage completion time which is the average of the examination stage completion times of the completed medical examinations or the subset of the completed medical imaging examinations; and a standard deviation of the examination stage completion time which is the standard deviation of the examination stage completion times of the completed medical examinations or the subset of the completed medical imaging examinations.

6. The non-transitory computer readable medium of claim 1, wherein:

the at least one completion time statistic includes an average completion time;

the displaying of the representation of the current status of the current medical imaging examination on the workstation includes displaying a graphical representation of the elapsed time of the current medical imaging examination; and the displaying of the representation of the at least one completion time statistic on the workstation includes displaying the average completion time as a graphical representation superimposed on the graphical representation of the elapsed time.

7. The non-transitory computer readable medium of claim 6 wherein:

the at least one completion time statistic includes a standard deviation of the completion time, and the displaying of the representation of the current status of the current medical imaging examination on the workstation further includes displaying the standard deviation of the completion time as a second graphical representation superimposed on the graphical representation of the elapsed time.

8. The non-transitory computer readable medium of claim 6, wherein the graphical representation of the elapsed time comprises a time bar plot and the graphical representation of the average completion time is displayed on or adjacent the time bar plot.

9. The non-transitory computer readable medium of claim 8, wherein the graphical representation of the elapsed time comprises a time bar plot and the graphical representation of the standard deviation is displayed on or adjacent the time bar plot.

10. The non-transitory computer readable medium of claim 1, wherein the method further includes:

identifying a trigger event based on a comparison of the elapsed time of the current medical imaging examination and the at least one completion time statistic; and causing the workstation to output an audible and/or visual alert in response to identifying the trigger event.

11. The non-transitory computer readable medium of claim 1, wherein extracting image features from image frames displayed on the display device of the controller operable by the local operator during the medical imaging examination further includes:

identifying a corresponding dialog screen template that corresponds to a dialog screen depicted in an image frame wherein the corresponding dialog screen template identifies one or more screen regions and associates the one or more screen regions with settings of the medical imaging examination; and extracting information from the image frame and associating the extracted information in the one or more screen regions with settings of the medical imaging examination using the associations provided by the corresponding dialog screen template.

12. The non-transitory computer readable medium according to claim 1, wherein the method further includes:

extracting the image features from the image frames displayed on the display device of the controller using screen sharing software running on the controller.

13. The non-transitory computer readable medium according to claim 1, wherein the method further includes:

at the workstation operated by the remote expert, receiving a video feed capturing the display device of the controller operated by the local operator;

displaying the video feed at the workstation operated by the remote expert; and extracting the image features from the received video feed.

14. The non-transitory computer readable medium according to claim 1, wherein the method further includes:

displaying the representation at the workstation operated by the remote expert-using a standard display format that is independent of the medical imaging device operated by the local operator during the medical imaging examination.

15. The non-transitory computer readable medium according to claim 1, wherein the method is performed at a plurality of sites including medical imaging devices operated by a corresponding number of local operators, and the representation include information from the sites of the plurality of sites.

16. The non-transitory computer readable medium of claim 1, wherein the method further includes establishing a communication pathway between the remote expert and the local operator by displaying an icon selectable by the remote expert on the remote workstation to initiate a videoconferencing call with the local operator.

17. The non-transitory computer readable medium of claim 1, wherein the method further includes:

retrieving patient data for a patient undergoing the medical imaging examination from a database;

extracting patient data features from the retrieved patient data; and converting the extracted image features and the extracted patient data features into the representation of a current status of the medical imaging examination.

18. An apparatus for providing assistance from a remote expert to a local operator during a medical imaging examination performed using a medical imaging device, the apparatus comprising:

a workstation operable by the remote expert; and at least one electronic processor programmed to:

extract image features from image frames displayed on a display device of a controller of the medical imaging device during medical imaging examinations performed using the medical imaging device;

map the image features to medical imaging examinations based at least on timestamps of the image features, the medical imaging examinations to which the image features are mapped including completed medical imaging examinations and a current medical imaging examination;

convert the image features mapped to each completed medical imaging examination into a representation of the completed medical imaging examination, wherein the representation of the completed medical imaging examination includes at least one completion time for the completed medical imaging examination;

generate at least one completion time statistic representing the completion times for the completed medical imaging examinations or a subset of the completed medical imaging examinations;

converting the image features mapped to the current medical imaging examination into a representation of a current status of the current medical imaging examination including at least an elapsed time of the current medical imaging examination;

during the current medical imaging examination, display the representation of the current status of the current medical imaging examination on a workstation that is separate from the medical imaging device;

while displaying the representation of the current status of the current medical imaging examination on the workstation, additionally display a representation of the at least one completion time statistic on the workstation; and display an icon selectable by the remote expert to establish a communication pathway between the remote expert and the local operator.

19. The apparatus of claim 18, wherein the at least one completion time for the completed medical imaging examination includes an examination completion time for the completed medical imaging examination, and the at least one completion time statistic comprises one or more of:

an average examination completion time which is the average of the examination completion times of the completed medical examinations or the subset of the completed medical imaging examinations; and a standard deviation of the examination completion time which is the standard deviation of the examination completion times of the completed medical examinations or the subset of the completed medical imaging examinations.

20. A method of providing assistance from a remote expert to a local operator during a plurality of medical imaging examinations, the method comprising:

extracting image features from image frames displayed on a display device of a controller of a plurality of medical imaging devices performing the plurality of medical imaging examinations;

converting the image features mapped to the current medical imaging examination into a corresponding number of representations of a current status of each current medical imaging examination; and displaying each representation of the current status of each current medical imaging examination on a workstation that is separate from the medical imaging device.

* * * * *

UNITED STATES PATENT AND TRADEMARK OFFICE
CERTIFICATE OF CORRECTION

| | | |
|---|---|---|
| PATENT NO. | : 12,451,234 B2 | Page 1 of 1 |
| APPLICATION NO. | : 18/265990 | |
| DATED | : October 21, 2025 | |
| INVENTOR(S) | : Koker et al. | |

It is certified that error appears in the above-identified patent and that said Letters Patent is hereby corrected as shown below:

On the Title Page

Item (72) Inventors' name section, please correct Inventor 6 from "Sandepp" to --Sandeep--.

Signed and Sealed this
Second Day of December, 2025

John A. Squires
*Director of the United States Patent and Trademark Office*